Patented Apr. 17, 1951

2,549,580

UNITED STATES PATENT OFFICE 2,549,580

ACYCLIC POLYFLUORINATED OLEFINS AND A PROCESS FOR THEIR PREPARATION

George H. Denison, Jr., Berkeley, and Alfred Goldschmidt, Oakland, Calif., assignors to California Research Corporation, San Francisco, Calif., a corporation of Delaware No Drawing. Application June 28, 1946,
Serial No. 680,084

15 Claims. (Cl. 260—653)

This invention relates to certain polymers of olefins and processes for making such polymers, said olefins being composed of more than two carbon atoms, one or more of which carbon atoms is polyfluorinated.

It is an object of our invention to provide relatively non-flammable materials which possess chemical stability and are especially resistant to oxidation and the action of heat.

It is a further object of our invention to produce new and useful olefin polymers containing polyfluorinated carbon atoms.

It is a particular object of our invention to provide liquid polymers with viscosities and viscosity indices suitable for use as lubricants, coolants, hydraulic oils and the like, which polymers are characterized by high chemical stability, relative nonflammability and noncorrosiveness and which at elevated temperatures normally encountered in service do not split off undesirable products.

It has been recognized in the past that the carbon-to-fluorine bond is very weak where only one fluorine atom is attached to the carbon atom, as in the case of 1-fluorobutane (CH$_2$FCH$_2$CH$_2$CH$_3$)

2-fluorobutane (CH$_3$CHFCH$_2$CH$_3$) and 2-fluoro-2-methylpropane [CH$_3$CF(CH$_3$)$_2$]. In such compounds, even at low temperatures, the fluorine atom is easily removed by various chemical agents. Heat causes the splitting out of corrosive hydrogen fluoride from these materials. It is known, however, that materials containing one or more polyfluorinated carbon atoms possess enhanced stability.

Though materials containing polyfluorinated carbon atoms are known to possess unusual stability, the commercial utilization of this phenomenon has been limited greatly by the lack of methods of preparing such materials of suitable molecular weights, viscosity, viscosity indices, and the like.

Others have prepared monomers of the type

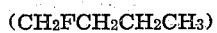

and have polymerized such monomers to obtain high molecular weight solids. Such high molecular weight, solid, fluorinated ethylene polymers are described in United States Patents 2,230,654, 2,393,967, 2,394,243, 2,394,960, and 2,395,327. Though such materials possess remarkable qualities and are extremely stable, their range of physical properties is greatly limited.

In our search for nonflammable materials possessing unusual stability to oxidation and to the action of heat and to chemical change in general, we have discovered certain polymers of olefins and processes for making such polymers, said olefins being composed of more than two carbon atoms at least one of which is polyfluorinated.

Attempts have been made to manufacture liquid substances of high molecular weight containing polyfluorinated carbon atoms by the direct introduction of fluorine into hydrocarbon molecules of high molecular weight or by direct chlorination of such molecules followed by exchange of fluorine for chlorine. However, such methods have not been found practicable, because the halogenation is not directed and proceeds at random, resulting in the formation of unstable materials from which hydrogen chloride and fluoride split off easily.

According to our invention, the desired stable products, with ranges of viscosity and molecular weights including those of the range of lubricants, can be obtained by the polymerization of olefins containing more than two carbon atoms, one or more of which carbon atoms has been first polyfluorinated.

Our polymers and methods of manufacturing them are illustrated in the examples set forth as follows:

EXAMPLE 1

Commercial propylene chloride was chlorinated in the dark at about 212° F., using iron filings as catalyst. The reaction involved is as follows:

CH$_2$Cl—CHCl—CH$_3$+Cl$_2$→
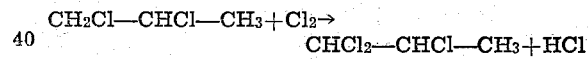
CHCl$_2$—CHCl—CH$_3$+HCl

Trichloropropane was obtained in 40% conversion, as the cut boiling between 263° and 272° F. at atmospheric pressure. This was slowly added with good agitation to an excess of 20% sodium hydroxide solution at about 212° F. to bring about the following reaction:

CHCl$_2$—CHCl—CH$_3$+NaOH→
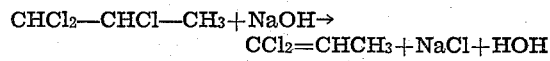
CCl$_2$=CHCH$_3$+NaCl+HOH

The dichloropropene so formed was collected between 169° and 171° F. in a 75% conversion, and was heated in a pressure vessel with a 100% molar excess of anhydrous hydrogen fluoride for 45 hours at 247° F. and at a maximum pressure of 800 pounds per square inch gauge, to obtain the following reaction:

$$CCl_2=CH-CH_3 + 3HF \rightarrow CF_3-CH_2-CH_3 + 2HCl$$

The charge from the pressure vessel was finally vented through a caustic scrubber and drying tubes into a cold-trap receiver. A 70% conversion to trifluoropropane, boiling sharply at 8.6° F. at atmospheric pressure, was obtained. This product was in turn photochemically chlorinated in the vapor phase, using an excess of trifluoropropane, and the gas cooled to obtain a 43% conversion to 3-chloro-1,1,1-trifluoropropane which boiled sharply at 113° F. at atmospheric pressure.

$$CF_3-CH_3 + Cl_2 \rightarrow CF_3-CH_2-CH_2Cl + HCl$$

When the 3-chloro-1,1,1-trifluoropropane was added slowly to a 50% molar excess of a 20% solution of caustic soda in 50% alcohol at 118–145° F. at atmospheric pressure, the 3,3,3-trifluoropropene boiled off and was collected in a cold trap. The final product boiled sharply at −14.8° F. and was obtained in a 70% conversion.

$$CF_3-CH_2-CH_2Cl + NaOH \rightarrow CF_3-CH=CH_2 + NaCl + H_2O$$

The 3,3,3-trifluoropropene so obtained and one-eighth its weight of acetyl peroxide, as a 30% solution in dimethyl phthalate, were introduced into a chromium nickel steel pressure vessel and heated for 93 hours at 145° F. The starting pressure at this temperature was 190 and the final pressure 200 pounds per square inch gauge. After the autoclave had cooled to room temperature, the pressure was released. The dimethyl phthalate and the liquid decomposition products of the peroxide were removed by a treatment with a concentrated aqueous sodium hydroxide solution and washing with water. The pale yellow, liquid polymer was found to have a viscosity of 1095 (S. S. U.) at 210° F., a carbon content of 37.6%, a hydrogen content of 3.4% and a fluorine content of 61.1%. The analysis confirms the formulation:

$$\left( \begin{array}{cc} H & H \\ -C-C- \\ CF_3 & H \end{array} \right)_n$$

Ebullioscopic determination indicated a molecular weight of 1260.

EXAMPLE 2

Amyl trifluoroacetate was treated with methyl magnesium iodide, and the resulting Grignard compound was decomposed with dilute sulfuric acid to yield 2-methyl-1,1,1-trifluoro-2-propanol. This reaction is indicated below:

$$CF_3.COOC_5H_{11} + 2CH_3MgI \rightarrow$$
$$CF_3.C(CH_3)_2 OMgI + C_5H_{11}OMgI$$
$$CF_3.C(CH_3)_2OMgI + HOH \rightarrow$$
$$CF_3.C(CH_3)_2OH + MgI(OH)$$

The tertiary alcohol was distilled and the cut between 177° and 178° F. was collected. The alcohol, which crystallized in the form of long needles at 64° F., was then dehydrated (according to Swarts, Bull. soc. chim. Belg., 1927, 197–201):

$$CF_3.\overset{CH_3}{\underset{CH_3}{C}}-OH \longrightarrow CF_3.\overset{CH_3}{C}=CH_2$$

With rigorous exclusion of moisture, the alcohol was added to 1.1 mole of phosphorus pentabromide and the mixture was then heated rapidly to 131–141° F. Gaseous products were evolved immediately. The gas was passed through a water scrubber and a Drierite tube and collected in a trap cooled with Dry Ice. The 2-methyl-3,3,3-trifluoropropene was collected as the fraction boiling between 41.8° and 42.8° F.

The 2-methyl-3,3,3-trifluoropropene and one-twelfth its weight of propionyl peroxide were introduced into a chromium nickel steel pressure vessel and heated for 136 hours at 150° F. At the beginning of the reaction period the pressure was 130 pounds per square inch gauge and increased during this period to 275 pounds per square inch gauge. At the end of the heating period, the mixture was allowed to cool to room temperature and the pressure was released. The dimethyl phthalate and the liquid decomposition products of the peroxide were removed and a clear, light yellow oil was obtained. The polymer showed a carbon content of 46.1%, a hydrogen content of 5.5% and a fluorine content of 48%. Its refractive index, $n_D^{20}$, is 1.3831 and the indicated mean molecular weight is 885.

EXAMPLE 3

3,3,3-trifluoropropene, prepared as described in Example 1, and one-tenth its weight of propionyl peroxide, as a 50% solution in ethyl phenylacetate, were heated for 112 hours at 145° F. as described in Example 1. Polymers of the type:

$$\left( \begin{array}{c} -CH_2.CH- \\ | \\ CF_3 \end{array} \right)_n$$

were obtained, in a 71% conversion.

EXAMPLE 4

Trifluoroisobutene and one-ninth its weight of benzoyl peroxide, as a 25% solution in 1,4-dioxan, were heated for 112 hours at 160° F. in a pressure vessel. The pressure throughout the reaction period remained substantially constant at 190 pounds (at 160° F.). Upon cooling to room temperature, release of the pressure and removal of the liquid decomposition products of the peroxide and of the solvent, a 25% conversion to an oily polymer was obtained. Analysis showed a viscosity of 175 S. S. U. at 210° F. and an indicated mean molecular weight (ebullioscopic method) of 910.

EXAMPLE 5

A 1.5:1 mixture of trifluoroisobutene and trifluoropropene and one-fifth their combined weight of propionyl peroxide were heated for 112 hours at 145° F. in a pressure vessel. Upon cooling to room temperature and removing the liquid decomposition products of the peroxide, a clear, colorless oil was obtained in an 80% conversion. Analysis showed a density ($d_4^{20}$) of 1.344, a refractive index, $n_D^{20}$, of 1.3763, and a viscosity of 130 S. S. U. at 100° F.

EXAMPLE 6

A 1:1 mixture of freshly distilled styrene and trifluoroisobutene and one-tenth their combined weight of propionyl peroxide were heated for 136 hours at 155° to 190° F. in a pressure vessel. Upon cooling to room temperature and removing the liquid decomposition products of the peroxide, a clear, light yellow polymer was obtained. This polymer is glass-like and brittle at room temperature and fluid at 155° F. Analysis showed a fluorine content of 10%.

The preceding examples, and additional examples, summarized in the following table, illustrate but do not limit our invention.

*Summary of polymerization experiments*

| Ex. No. | Monomers | Catalyst | Ratio Monomer: Catalyst | Solvent |
|---|---|---|---|---|
| 1 | 3,3,3-Trifluoropropene | Acetyl peroxide | 8:1 | Dimethyl phthalate |
| 2 | 2-Methyl-3,3,3-trifluoropropene | Propionyl peroxide | 8:1 | None. |
| 3 | 3,3,3-Trifluoropropene | ---do--- | 8:1 | Ethyl phenylacetate. |
| 4 | 2-Methyl-d,d,d-trifluoropropene | Benzoyl peroxide | 9:1 | 1,4-Dioxan. |
| 5 | 3,3,3-Trifluoropropene: 2-Methyl-3,3,3-trifluoropropene (1:1.5). | Propionyl peroxide | 5:1 | None. |
| 6 | 2-Methyl-3,3,3-trifluoropropene: styrene (1:1). | ---do--- | 10:1 | None. |
| 7 | 2-Methyl-3,3,3-trifluoropropene | ---do--- | 10:1 | None. |
| 8 | 3,3,3-Trifluoropropene | Acetyl peroxide | 14:1 | Dimethyl phthalate. |
| 9 | 3,3,3-Trifluoropropene | ---do--- | 50:1 | Do. |
| 10 | 2-Methyl-3,3,3-trifluoropropene | Propionyl peroxide | 18:1 | n-Heptane. |

| Ex. No. | Reaction Time, Hrs. | Temp., °F. | Conversion, Per Cent | Refractive Index $n_D^{20}$ | Density $d_4^{20}$ | Viscosity, S. S. U. | Indicated Mean Mol. Wt. | Appearance |
|---|---|---|---|---|---|---|---|---|
| | | | | | | °F. | | |
| 1 | 93 | 145 | 95 | | | 1095/210 | 1,260 | Pale yellow oil. |
| 2 | 136 | 150 | 60 | 1.3831 | | | 885 | Do. |
| 3 | 112 | 145 | 70 | | | | | Amber-colored oil. |
| 4 | 112 | 160 | 25 | | >1.30 | 175/210 | 910 | Light yellow oil. |
| 5 | 112 | 145 | 80 | 1.3763 | 1.344 | 130/100 | | Colorless oil. |
| 6 | 136 | 155–190 | 65 | | | | | Yellow, glossy, transparent product. |
| 7 | 91 | 145 | 60 | | | 95/100 | | Pale yellow oil. |
| 8 | 70 | 145 | 88 | 1.3740 | 1.623 | | | Do. |
| 9 | 112 | 145 | 50 | | | | | Do. |
| 10 | 116 | 160 | 20 | | >1.30 | | | Light yellow oil. |

For monomeric materials to be polymerized according to our invention, we prefer to employ propenes, butenes and pentenes (including their isomers) in which one or more of their carbon atoms has been polyfluorinated, for instance:

3,3,3-trifluoropropene
3,3-difluoropropene
1,1-difluoropropene
1,1,3,3-tetrafluoropropene
4,4,4-trifluorobutene
3,3-difluorobutene
3,3,4,4-pentafluorobutene
1,1-difluoro-1-butene
3,3,3-trifluoro-2-methylpropene
3,3,3-trifluoro-2-trifluoromethylpropene
3,3-difluoropentene
4,4-difluoro-1-pentene
1,1-difluoro-1-pentene
4,4,5,5,5-pentafluoro-1-pentene
5,5,5-trifluoro-2-pentene Higher members of the olefin series, such as hexene, heptene, octene, nonene, and their isomers, containing one or more polyfluorinated carbon atoms may also be used. However, we prefer to employ the C₃ to C₅ olefins containing polyfluorinated carbon atoms because such lower members are more readily available and are, in themselves, capable by polymerization of being made into polymers of substantially the same characteristics as those possible from the polymerization of the higher members containing one or more polyfluorinated carbon atoms.

It is to be understood that one or more halogen atoms, chlorine for instance, may exist in the above described polymerizable monomers and be attached to the polyfluorinated carbon atoms. For instance, in the list of polymerizable monomers we have included 3,3-difluoropropene. However, 3-chloro-3,3-difluoropropene is also included within the scope of our polymerizable monomers.

In preparing starting monomeric materials containing one or more polyfluorinated carbon atoms any of the various methods of preparing such compounds may be employed.

The preparation of such compounds has been described in the literature. See, for instance, Swarts., Bull. soc. chim. Belg., 1902, 731; 1927, 195; 1929, 108; Henne, Whaley and Stevenson, J. Am. Chem. Soc., 63, 3478–9 (1941); Meslans, Compt. rend., 111, 882 (1890); Henne and Hinkamp, J. Am. Chem. Soc., 67, 1194, 1906 (1945); Henne and Whaley, J. Am. Chem. Soc., 64, 1157 (1942); McBee et al., Abstracts of Papers 109th Meeting of Am. Chem. Soc., p. 8 M (1946).

As polymerization catalysts, we prefer to use the peroxy compounds containing the –O–O– linkage, especially the acyl peroxides such as acetyl peroxide, propionyl peroxide and benzoyl peroxide. However, other well-known, suitable peroxy polymerization catalysts may be used. Among such known peroxy catalysts are acetyl benzoyl peroxide, succinyl peroxide, lauroyl peroxide, tertiary butyl hydroperoxide, tertiary butyl peroxide, inorganic peroxides including the sodium, potassium and ammonium salts of perphosphoric, persulfuric, and other peracids. Molecular oxygen may also be used to initiate the polymerization reactions.

When using solid catalysts, such as benzoyl peroxide, we find it advantageous to employ a mutual solvent for the material to be polymerized and the catalyst. Among the many mutual solvents which may be employed are dimethyl phthalate, diethyl phthalate, dibutyl phthalate, diamyl phthalate, ethyl phenylacetate, amyl acetate, heptane, dioxans such as 1,4-dioxan, heavy ethers such as dibutyl ether, and the like.

The percentage of the mutual solvent employed is not critical. Though we prefer to use the catalysts in about a 50% solution, the percentage may be varied widely.

The amount of catalyst used may be widely varied. Generally, nothing is gained by using in excess of 20%, based on the weight of material to be polymerized. However, larger percentages and percentages as low as 0.1% and lower may be used effectively. We prefer to use about 5–10%.

The temperature at which the polymerization occurs may be varied. Under conditions described in the examples cited, applicants obtained maximum conversion with a reaction temperature of 145° F. Temperatures as low as 100° F., and lower, may be used. The use of temperatures above 250° F. is usually dependent on the nature of the particular catalyst employed.

The term "polymer," as used herein, is intended to comprehend homopolymers, copolymers and heteropolymers. Though it is preferred to work with monomers, such as propene, butene and pentene, containing one or more polyfluorinated carbon atoms, we may use mixtures of the various polymerizable monomers and also mixtures of such starting monomers with such diverse compounds as styrene, vinyl ethers, diolefins, acrylic acid, and the like.

Our polymers, made by the polymerization of olefins containing more than two carbon atoms, one or more of which carbon atoms has been polyfluorinated, are to be sharply distinguished from polymers made by the polymerization of polyfluorinated ethylene, for instance, tetrafluoroethylene polymers. It will be noted that, from the standpoint of polymer structure, tetrafluoroethylene has no homologue, since the removal of one fluorine to be replaced by a substituent group yields a relatively unstable monofluoro group in the final polymer. This is represented below:

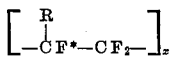

The fluorine atom, marked with an asterisk, is attached to a carbon atom holding no other fluorine atom. The marked fluorine atom is accordingly relatively unstable and may be hydrolyzed off with various reagents or may be split out in combination with a hydrogen atom from the substituent group, R, in a dehydrofluorination process. From the chemical and physicochemical standpoint, the tetrahaloethylenes constitute a class in themselves, as is often the case with the lowest example of a given series; for instance, formic acid in the aliphatic acid series, formaldehyde in the aliphatic aldehyde series, and nitromethane in the nitroalkane series. These lowest series members have certain reactions peculiar to themselves and not shared with the higher members of the series.

The stability of groups containing a polyfluorinated carbon atom has been attributed to the contraction of the group as evidenced by shortened atomic distances. For instance, in the group, —CFH$_2$, the carbon-to-fluorine atomic distance has a value of 1.42 angstrom units (A. U.), whereas in the group, —CF$_2$H, the carbon-to-fluorine bond is measured at 1.36 A. U. The contraction of the atomic distances creates a more compact molecule, and it is accordingly more difficult to bring about any removal or substitution of the various parts thereof. It will be noted that in the halogen family this property is peculiar to fluorine. Whereas the carbon-to-fluorine bond in the —CF$_3$ group has a value of 1.35 A. U., the carbon-to-chlorine bond in the group —CCl$_3$ has a value of 1.77 A. U. which represents no shortening over that expected from the normal covalent radii of carbon and chlorine. This may be said to account for the fact that efforts to prepare stable, nonflammable polymers from chlorinated olefins have not met with success, because the polymers so formed decompose at relatively low temperatures.

However, the presence on a carbon atom holding a halogen atom other than fluorine, chlorine for instance, of two fluorine atoms results in the shortening of the distance between the carbon nucleus and the nucleus of the original halogen, with the resultant stabilization of the original halogen. For example, the carbon-to-chlorine bond in the group, —CH$_2$Cl, has a value of 1.77 A. U., but in the group, —CF$_2$Cl, the carbon-to-chlorine bond has a value of 1.73 A. U. This suggests an explanation of the fact that in preparing stable polymers by the polymerization of olefins containing more than two carbon atoms, one of which carbon atoms is polyfluorinated, it is true, as just pointed out, that such polymers retain their remarkable stability in spite of the fact that they also contain chlorine atoms which normally would be reactive.

The preferred embodiments of the present invention are those polymers made by the polymerization of olefins containing the trifluorinated methyl group, —CF$_3$, where three fluorine atoms are attached to a single carbon atom. These compounds are illustrated by polymers made by the polymerization of 3,3,3-trifluoropropene, 4,4,4-trifluorobutene, 2-methyl-3,3,3-trifluoropropene, and the like. Polymers of such compounds, containing groups of three fluorine atoms attached to a single carbon atom, have been found to possess maximum stability and have the property of imparting the great stability of the —CF$_3$ group itself to neighboring groups which would normally be more reactive. The property of extending stability characteristics to other groups in the molecule is especially pronounced in the case of the trifluoromethyl group.

To illustrate their stability, our polymers were heated for an hour in an air current with the direct flame of a Bunsen burner until they had entirely volatilized or disappeared. Even under these extreme conditions, no flash occurred. Analysis of the vapors showed that only about 0.8% of the fluorine present was converted into corrosive, poisonous hydrogen fluoride. Corresponding polymers containing halogens other than fluorine, chlorine for instance, have no such thermal stability and, even at moderate temperatures, have a strong tendency to decompose and, in the case of those containing chlorine, evolve corrosive hydrogen chloride. Our polymers can be handled safely even when forced into existing fires.

Our polymers also exhibit a remarkable resistance to oxidation. For instance, the polymers were heated to 540° F. and contacted with a rich supply of oxygen for 5 hours. Even under such conditions the polymers were substantially unoxidized and only slightly discolored.

In addition, our polymers may be manufactured both as stable solids and as liquids with moderate viscosity indices. The corresponding liquid polymers containing chlorine instead of fluorine, however, have viscosity indices markedly lower, for example as low as —447. The molecular weight of the polymers may be controlled in the conventional manner applicable to polymerization of olefins not containing polyfluorinated carbon atoms.

The above and other properties of our polymers render the polymers widely useful, either alone or in admixtures with other oils, as nonflammable hydraulic oils, coolants, cutting oils, extreme pressure lubricants, and airplane crankcase oils, where their satisfactory viscosity indices, non-flammability, extreme stability to heat and oxidation, and their low sludge values render them especially valuable.

We claim:

1. An acyclic normally liquid polymer having an ethylenic linkage, the monomeric units of said polymer consisting of fluorinated aliphatic olefin material free from monofluorinated carbon atoms and having at least one polyfluorinated carbon atom and three to nine carbon atoms.

2. A normally liquid polymer substantially as described in claim 1, wherein said olefin material is a 1-olefin.

3. A normally liquid polymer substantially as described in claim 2, wherein the polyfluorinated carbon atom is a trifluorinated carbon atom.

4. A normally liquid polymer substantially as described in claim 1, wherein said olefin material is a 2-olefin.

5. A normally liquid polymer substantially as described in claim 4, wherein the polyfluorinated carbon atom is a trifluorinated carbon atom.

6. A normally liquid polymer substantially as described in claim 1 wherein the polyfluorinated carbon atom is a trifluorinated carbon atom.

7. A normally liquid polymer substantially as described in claim 1 wherein said olefin material has three to five carbon atoms.

8. A normally liquid polymer substantially as described in claim 7 wherein the polyfluorinated carbon atom is a trifluorinated carbon atom.

9. A normally liquid polymer substantially as described in claim 8 wherein said olefin material is 3,3,3-trifluoropropene.

10. A normally liquid polymer substantially as described in claim 8, wherein said olefin material is 3,3,3-trifluoro-2-methylpropene.

11. The process of preparing a liquid polymer from fluorinated aliphatic olefin material free from monofluorinated carbon atoms and having at least one polyfluorinated carbon atom and 3 to 9 carbon atoms, which comprises subjecting said fluorinated olefin material in a reaction zone to a temperature ranging from about 100° F. to about 250° F. in the presence of a peroxy catalyst and a mutual solvent for said catalyst and said olefin, said polyfluorinated olefin being the sole polymerizable material in said reaction zone.

12. The process substantially as described in claim 11, wherein said fluorinated olefin is a 1-olefin and the polyfluorinated carbon atom is a trifluorinated carbon atom.

13. The process substantially as described in claim 11, wherein said fluorinated olefin material has 3 to 5 carbon atoms and said polyfluorinated olefin is a trifluorinated olefin.

14. The process substantially as described in claim 13 wherein said fluorinated olefin is 3,3,3-trifluoropropene.

15. The process substantially as described in claim 13, wherein said fluorinated olefin is 3,3,3-trifluoro-2-methyl-propane.

GEORGE H. DENISON, Jr.
ALFRED GOLDSCHMIDT.

REFERENCES CITED

The following references are of record in the file of this patent:

UNITED STATES PATENTS

| Number | Name | Date |
|---|---|---|
| 2,393,967 | Brubaker | Feb. 5, 1946 |
| 2,394,243 | Joyce | Feb. 5, 1946 |
| 2,396,713 | Martin | Mar. 19, 1946 |
| 2,411,159 | Hanford | Nov. 19, 1946 |
| 2,446,382 | Mochel | Aug. 3, 1948 |
| 2,468,664 | Hanford et al. | Apr. 26, 1949 |

FOREIGN PATENTS

| Number | Country | Date |
|---|---|---|
| 796,026 | France | Jan. 17, 1936 |